May 3, 1966  J. M. BOXERT  3,249,723
TEMPERATURE REGULATOR WITH MEANS FOR ADJUSTING
BOTH OPERATING RANGE AND DIFFERENTIAL
Filed Feb. 24, 1964  3 Sheets-Sheet 1
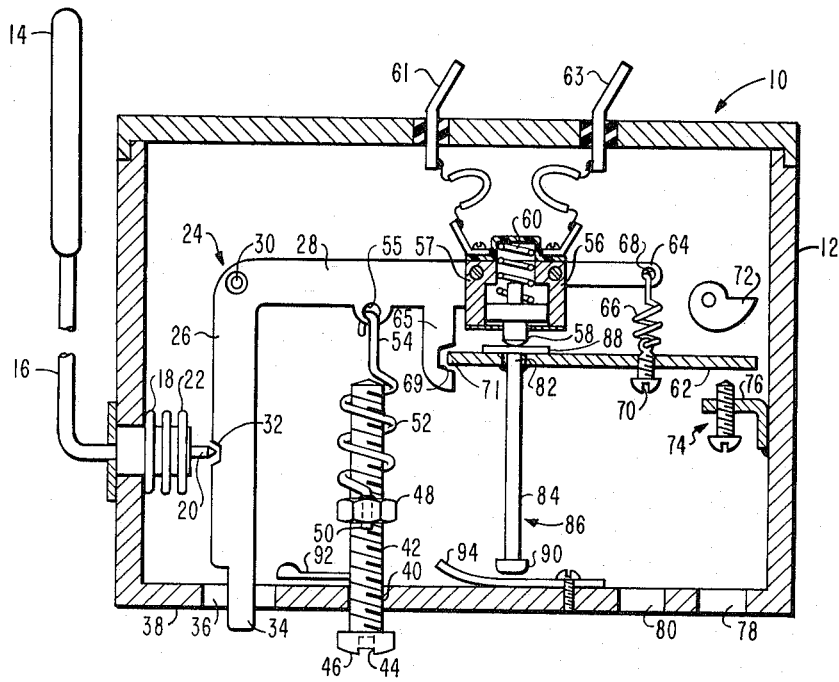
FIG.—1
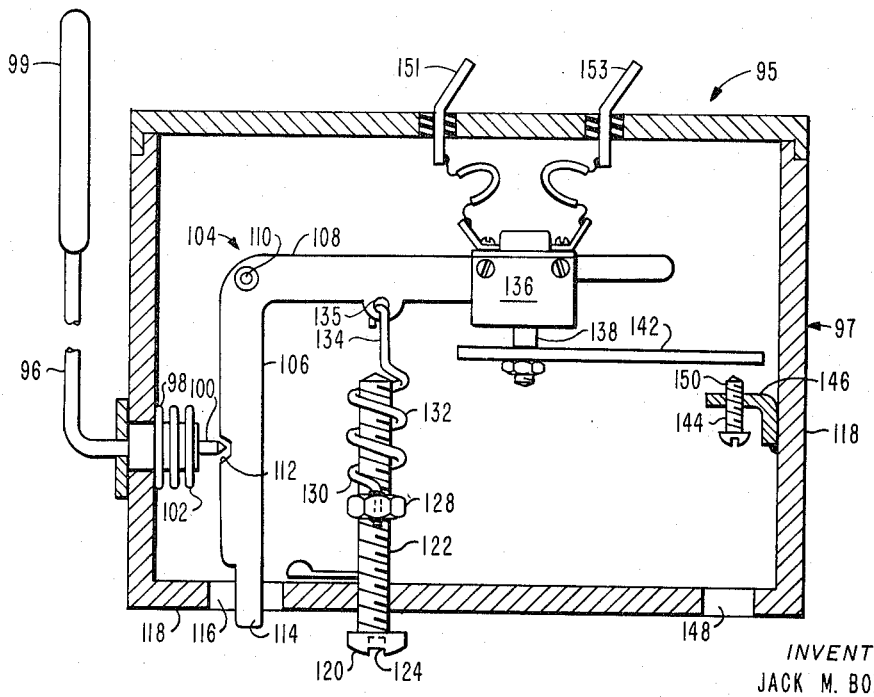
FIG.—2
INVENTOR
JACK M. BOXERT
BY
*Julius L. Rubinstein*
ATTORNEY

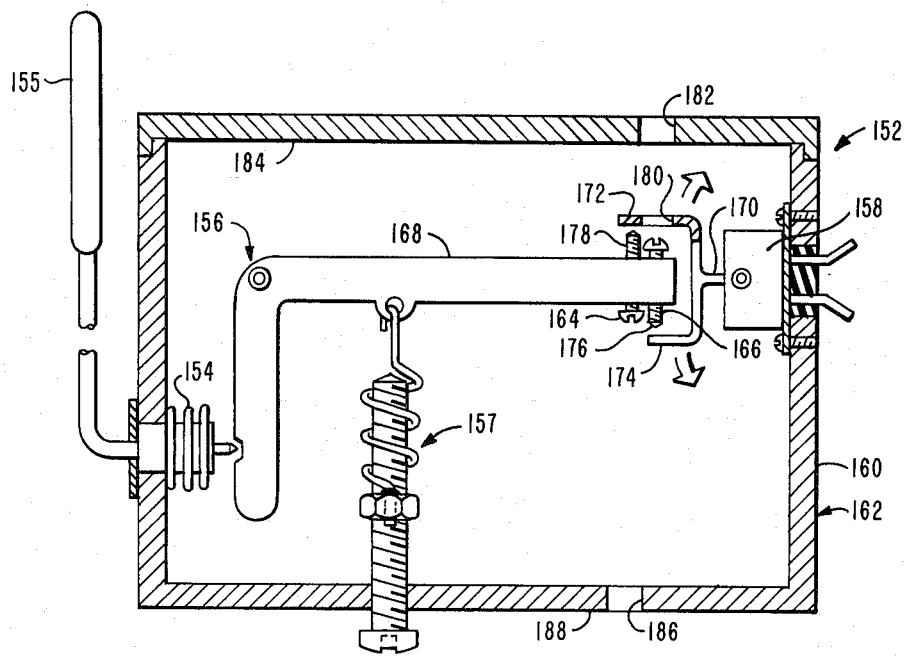
FIG.—3
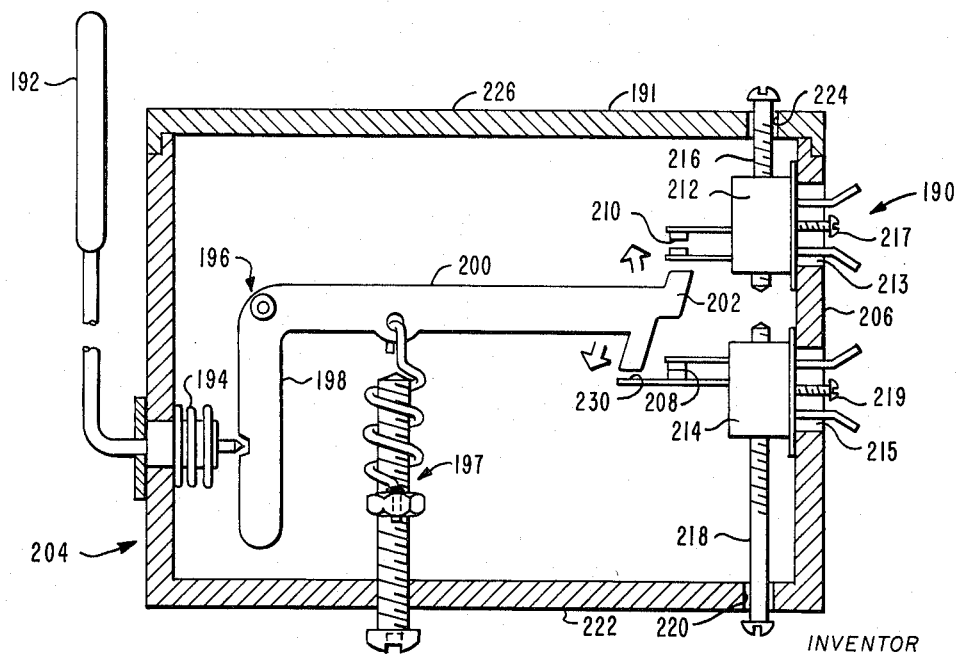
FIG.—4
INVENTOR
JACK M. BOXERT
BY *Julius L. Rubinstein*
ATTORNEY May 3, 1966 J. M. BOXERT 3,249,723
TEMPERATURE REGULATOR WITH MEANS FOR ADJUSTING
BOTH OPERATING RANGE AND DIFFERENTIAL
Filed Feb. 24, 1964 3 Sheets-Sheet 3

INVENTOR
JACK M. BOXERT
BY
Julius L. Rubinstein
ATTORNEY

United States Patent Office 3,249,723
Patented May 3, 1966

3,249,723
TEMPERATURE REGULATOR WITH MEANS FOR ADJUSTING BOTH OPERATING RANGE AND DIFFERENTIAL
Jack M. Boxert, 1325 Hauser Blvd., Los Angeles 19, Calif.
Filed Feb. 24, 1964, Ser. No. 346,901
2 Claims. (Cl. 200—140)

The present invention relates to a regulator, and more particularly to a temperature regulator for a refrigerator.

A temperature regulator for a refrigerator is a device which stops the refrigerator motor whenever the temperature inside the refrigerator drops to a predetermined minimum and restarts the refrigerator motor whenever the temperature inside the refrigerator rises to a predetermined maximum. The maximum and minimum operating limits at which the regulator is actuated is called the range of the refrigerator, and the difference between the maximum and minimum operating limits is called the differential of the regulator.

Household refrigerators are provided with a regulator which has a mechanism for varying the range of the regulator. By way of example, suppose a refrigerator regulator is designed to stop the refrigerator motor whenever the temperature inside the refrigerator falls to 15° F. and to start the refrigerator motor whenever the temperature rises to 25° F. Then the differential of the regulator would be 10°. Adjustment of the mechanism for varying the range of the regulator could cause the refrigerator to operate between 10° and 20° for example if it were desired to keep the refrigerator cooler, or to operate between 20° and 30° if it were desired to keep the refrigerator warmer. But in each instance the differential of the refrigerator would remain at 10°.

Regulators used in home refrigerators are not designed for, and do not have suitable means for changing both the range and the differential of the regulator. In other words adjustment of the mechanism for varying the range of the regulator described above could not cause the regulator to automatically stop the refrigerator motor when the temperature rises to 30° and to start the motor when the temperature drops to 10°, thus increasing the differential of the regulator from 10° to 20°.

There are, however, a great many models of refrigerators on the market and the regulators in these refrigerators are different and are not generally interchangeable. This is because structural differences in these refrigerators cause them to require regulators which have different temperature differentials and ranges. For example some refrigerators have a 10° differential and operate between 15° to 25°. Other refrigerators may have 15° differentials and operate from 12° to 27°, etc. If a temperature regulator, not designed for a particular refrigerator and having the wrong temperature differential were installed in such refrigerator, the result could be that the refrigerator motor could operate continuously, or the refrigerator motor would stop and start at very frequent intervals with consequent wear on the equipment.

As a result of the non-interchangeability of temperature regulators for refrigerators, refrigerator dealers and repair organizations are required to keep in stock large numbers of temperature regulators for the various model refrigerators currently on the market, and for the various older model refrigerators which are no longer in production. Keeping all these regulators in stock ties up a great deal of money and is the source of loss because there is no certainty that a requirement will ever come in for a particular temperature regulator which is kept in stock.

It is apparent that a temperature regulator with both a convenient external temperature range adjustment and a differential adjustment could be adapted for use in all models of refrigerators. This would eliminate the necessity and the expense involved in keeping in stock large numbers of temperature regulators for all models of refrigerators.

What is needed therefore and comprises an important object of this invention is to provide a simple, easy to manufacture, and inexpensive universal temperature regulator which can be installed in any model refrigerator.

A further object of this invention is to provide a simple, easy to manufacture temperature regulator for refrigerators which has both a range and a differential adjustment.

These and other objects of this invention will become more apparent when read in the light of the accompanying drawings and specification wherein:

FIG. 1 is a plan view of one form of a universal temperature regulator having a variable differential control.

FIG. 2 is a plan view of a modified universal temperature regulator embodying the principles of this invention but designed to have a minimum temperature differential.

FIG. 3 is a plan view of another modification of the universal temperature regulator shown in FIG. 1, embodying the principles of this invention and provided with means for varying the temperature differential of the regulator.

FIG. 4 is a plan view of a further modification of a universal temperature regulator embodying the principles of this invention and having means for varying the differential of the regulator.

Figure 6:
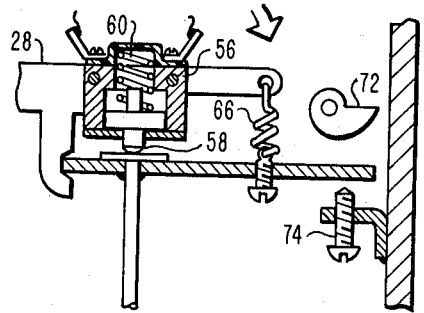
FIG. 6 is a plan view of a portion of the universal regulator shown in FIG. 1, illustrating the movement of the lever assembly caused by operation of the refrigerator motor.

Referring now to FIG. 1 of the drawing, a universal temperature regulator indicated generally by the reference numeral 10 comprises an external housing 12. A remote temperature sensitive capillary tube 14 adapted to be mounted inside a refrigerator box is connected by a connecting tube 16 to a resilient bellows 18, mounted inside housing 12. A pointed push member 20 is secured to the free end 22 of bellows 18 and is movable therewith. It is apparent that as the temperature in the temperature sensitive capillary tube 14 rises, the pressure inside the tube increases, causing the resilient bellows 18 to expand. Conversely, as the temperature in the capillary tube 14 decreases, its internal pressure drops, permitting the resilient bellows 18 to contract.

A lever assembly 24 comprising arms 26 and 28 is pivotally mounted inside housing 12 on pivot pin 30. Arm 26 is provided with a recess 30 for receiving the push member 20 on the free end 22 of bellows 18. The free end 34 of arm 26 extends through a slotted opening 36 in wall 38 of housing 12. In this way the ends of slot 36 serve to limit the movement of the lever assembly 24. It is however to be understood, as will become more apparent from the description of the operation of the regulator, that the lever assembly is not essential. It only serves as a motion transmitting device and other mechanisms such as rods, bars, gears, etc., could also be used in place of the lever assembly, and such use is contemplated.

Wall 38 is also provided with a threaded opening 40 for receiving a universal range screw 42. The range screw is threaded in this opening, as shown in FIG. 1. A threaded recess 44 is formed in the head 46 of range screw 42 so that dial adaptor shafts for various model refrigerators can be mounted thereon, to accommodate the control dials in each refrigerator.

A range spring retaining nut 48 to which one end 50 of a range spring 52 is attached is threaded onto the portion of the range screw inside housing 12 as shown in the drawing. The opposite end 54 of the range spring 52 is hooked into an opening 55 formed in arm 28 of lever 24. The range screw 42 is adjusted to put range spring 52 in tension so as to exert a clockwise torque or pull on lever assembly 24. It is also apparent that as the temperature in the capillary tube 14 rises bellows 18 expands until the pointed push member 20 engages the recess 32 in arm 26 and exerts a counterclockwise torque or pull on the lever assembly 24. The counterclockwise torque exerted by the expansion of bellows 18 will not be sufficient to overcome the tension in the range spring 52 until the temperature in capillary tube 14 reaches a predetermined level. Consequently adjustment of the range screw 42 which controls the tension in the range spring 52 provides a means for regulating the movement of the lever assembly 24 in accordance with the temperature in capillary tube 14 and hence provides a means for controlling the range of the temperature regulator.

An electric switch 56 is mounted on arm 28 of lever assembly 24 forming a part thereof so it is movable therewith. Electric switch 56 in this particular embodiment comprises a housing 57 with a plunger or push button actuator 58. Push button actuator 58 is movable between an extended switch closed portion, and a retracted switch open position. As seen in FIG. 1, the push button actuator 58 is biased outwardly to a switch closed position by an internal spring member 60. When the push button actuator 58 is pressed, the contacts (not shown) in switch 56 open in a manner well known in the art. When the pressure on push button actuator 58 is relieved, spring member 60 biases the actuator 58 to a switch closed position. Terminals 61 and 63 connected to switch 56 lead to a refrigerator motor.

A switch actuating arm 62 is associated with the push button actuator 58 and is connected to the free end 64 of the lever arm 28 by means of a balancing spring 66. With this arrangement actuating arm 62 may be described as part of lever arm 28 and is movable therewith. One end of the balancing spring 66 is hooked into an opening 68 formed in the free end 64 of arm 28. The opposite end of the balancing spring is attached to an adjusting screw 70 in threaded engagement with the switch actuating arm 62, as shown. The balancing spring is under tension and biases the actuating arm 62 toward the free end 64 of arm 28 so that the push button actuator 58 acts as a spacer and lightly contacts the actuating arm 62. It will of course be understood that although switch 56 is shown mounted on the free end of lever arm 28, it is also contemplated that the switch could also be mounted on the actuating arm 62 with the push button actuator 58 exending upwardly into engagement with a portion of lever arm 28.

Adjustably mounted abutment like actuators 72 and 74, hereafter simply referred to as abutments, are mounted on both sides of the switch actuating arm 62. In particular abutment 74 comprises a screw mounted on a support 76. An opening 78 is formed in the wall 38 below the head of the screw so that the spacing between the threaded end of the screw 74 and the switch actuating arm 62 can be varied. The abutment 72 on the opposite side of the switch actuating arm 62 can be either a screw, like screw 74, or as shown, it can be a rotatably mounted cam with means (not shown) for rotating the cam to vary the spacing between the cam and the actuating arm 62. It is of course understood that the structure of the abutments is not critical. Another opening 80 is formed in wall 38 to permit external adjustment of screw 70 so that the tension in the balancing spring 66 can be varied.

Figure 7:
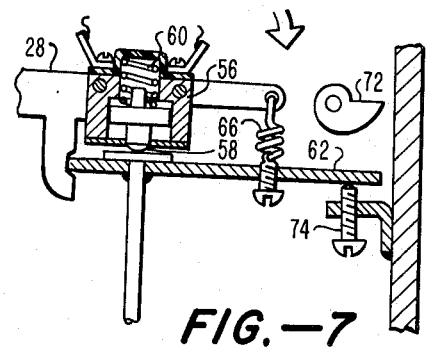
FIG. 7 is a plan view of a portion of a universal regulator similar to that shown in FIG. 6 but showing contact of a portion of the lever assembly with an abutment-like actuator, and its effect on the electric switch.

In operation to this point, if the capillary tube 14 is mounted in a suitable place inside a refrigerator, and if the refrigerator motor is initially on, then as the temperature in the refrigerator decreases the pressure in the capillary tube drops, permitting the bellows 18 to contract. Consequently the tension in the range spring 52 pulls the lever assembly 24 in the clockwise direction, as shown in FIG. 6. This continues until the switch actuating arm 62 engages the end of abutment 74. This engagement prevents further clockwise movement of the actuating arm 62, see FIG. 7. However the resilient spring connection between arm 28 of the lever assembly and the switch actuating arm 62 permits the lever assembly to continue to rotate in the clockwise direction until the push button actuator 58, pressed by actuating arm 62, moves further into the body of switch 56, see FIG. 7. This movement opens the contacts in switch 56 to turn off the refrigerator motor. Consequently abutment 74 may be described as a switch-off actuator.

Figure 8:
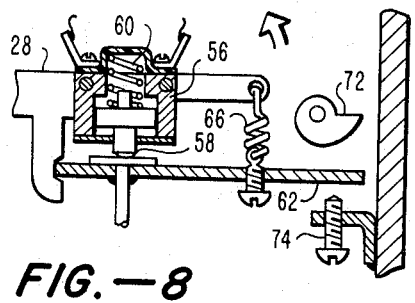
FIG. 8 is a plan view similar to that shown in FIG. 7 but showing the movement of the lever assembly after contact with the abutment-like actuator shown in FIG. 7.

After the refrigerator motor is turned off for a time, the temperature in the refrigerator box rises, increasing the pressure in the capillary tube 14. This pressure increase causes bellows 18 to expand, overcoming the tension in the range spring and causes the lever assembly 24 to rotate in the counterclockwise direction. As the lever assembly 24 rotates in the counterclockwise direction, the switch actuating arm 62 backs away from its engagement with the end of abutment 74. However as will be explained below, the tension in the balancing spring 66 maintains the switch actuating arm 62 in contact with the push button actuator 58 which has been pressed into a switch open position, see FIG. 8.

Spring 60 in switch 56 is under compression and exerts a force biasing the push button actuator 58 outwardly to a switch closed position. The tension in the balancing spring 66 is adjusted by means of screw 70 until it is large enough to oppose the action of spring 60. Consequently after switch 56 has been opened causing the refrigerator motor to stop, the counterclockwise movement of the lever assembly 24 away from abutment 74, caused by a temperature rise inside the refrigerator, while maintaining actuator arm 62 in contact with push button actuator 58, does not produce an actuation of switch 56. As a result the push button actuator 58 remains in a retracted switch open position while the lever assembly rotates in the counterclockwise direction, see FIG. 8.

Figure 9:
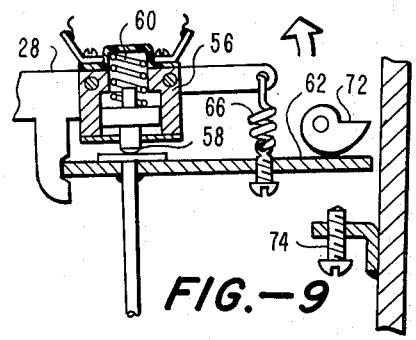
FIG. 9 is a plan view similar to that described in FIG. 8 but showing contact of a portion of the lever assembly with another abutment-like actuator, and its effect on the electric switch.

As the refrigerator continues to warm, lever assembly 24, under pressure from the expanding bellows 18 continues to rotate in the counterclockwise direction until the switch actuating arm 62 engages abutment 72. This engagement prevents further counterclockwise movement of the switch actuating arm 62, see FIG. 9. However because of the spring connection between the switch actuating arm 62 and the lever assembly 24, the lever assembly 24 can continue to rotate in the counterclockwise direction. When this happens, the push button actuator 58 is pulled out of contact with the switch actuating arm 62. Consequently the compression in switch spring 60 in switch 56 is unopposed and the push button actuator 58 is forced out to an extended switch closed position. For this reason abutment 72 may be described as a switch-on actuator.

This actuation of switch 56 starts the refrigerator motor which cools the refrigerator again, thereby decreasing the pressure in the capillary tube 14. As explained above, this causes the lever assembly 24 to rotate in the clockwise direction bringing the push button actuator 58 back into contact with the switch actuating arm 62. It is however, important to note again that the tension in the balancing spring 66 and the compression in spring 60 are adjusted so that this engagement does not result in an actuation of the switch 56. Consequently the push button actuator 58, although in engagement with the switch actuating arm 62 remains extended in a switch closed position. As a result the refrigerator motor remains on, causing the temperature in the refrigerator to continue to drop and causing a further clockwise rotation of the lever assembly 24 to repeat the cycle, see FIG. 6.

The lever assembly 28, is also provided with a depending portion 65. This depending portion is provided with a recess 69 into which an edge 71 of the actuating arm 62 extends. The walls of the recess 69 serve as limits to prevent the actuating arm 62 from tilting too much on contact with the abutments 72 and 74.

To summarize, the balancing spring 66 and the switch spring 60 are adjusted to oppose each other in such a way that each engagement of the switch actuating arm 62 with abutments 72 and 74 results in an actuation of the switch 56 and causes an eventual reversal of the direction of rotation of the lever assembly 24. Furthermore, there is never an actuation of the switch 56 when the switch actuating arm 62 is intermediate abutments 72 and 74. In particular the engagement of the switch actuating arm 62 with abutment 74 opens the switch 56 and the switch remains open until the lever assembly 24 rotating in the opposite direction causes the switch actuating arm 62 to engage abutment 72. This in turn causes the switch 56 to close and eventually produces a reverse rotation of lever assembly 24. The switch 56 remains closed until the switch actuating arm 62 again engages abutment 74 when it again opens as explained above.

It is clear from a consideration of the structure of the temperature regulator 10 shown in FIG. 1, that the rotational position of the lever assembly 24 is a function of the temperature of the capillary tube 14, and consequently is a function of the temperature inside the refrigerator. As stated above each engagement of the switch actuating arm 62 with the abutment 72 or 74 actuates switch 56 to start or stop the refrigerator motor. Consequently by varying the spacing between the abutments 72 and 74, the distance the lever assembly 24 must rotate before engaging abutments 72 and 74 will be changed. As a result the upper and lower temperature limits at which the refrigerator motor stops and starts can be adjusted and regulator 10 will be provided with a variable temperature differential. Of course suitable calibrations would be associated with the abutments 72 and 74 so that the regulator 10 may be conveniently adjusted for any desired temperature differential.

In order to provide a manually operated switch turn off, when it is desired to defrost or shut off the refrigerator, a small opening 82 is formed in the switch actuating arm 62 below the push button actuator 58. The stem 84 of a shut off member 86 is freely slidable in this opening. The head 88 of the shut off member 86 is enlarged for engagement with the push button actuator 58. The base 90 of the stem 84 of the shut off member 86 is also enlarged to serve as a push member, for reasons to become apparent below. A shut off camming arm 92 is attached to range screw 42 and extends generally radially out therefrom. The arm 92 is designed to engage a resilient camming member 94 when the range screw is rotated sufficiently. The camming member 94 is attached to wall 38 and is associated with the base 90 of the stem 84 of the shut off member 86 in such a way that rotation of the range screw 42 sufficiently far, causes camming arm 92 to engage camming member 94 and forces the shut off member 86 up against the push button actuator 58 to open the contacts in switch 56. This stops the refrigerator motor regardless of the temperature or pressure in the capillary tube 14. It is of course understood that the manually operated turn off mechanism shown in FIG. 1 is meant to be exemplary and the structure shown is not essential to the practice of the invention. It is clear that other mechanisms for turning off the refrigerator manually are possible and are contemplated.

To this point it has been implicit that the temperature regulator described above is used with an electrical refrigerator. However, it is apparent that the principles and mechanism so far described are equally applicable to a gas refrigerator. The only difference would be that the electrical switch 56 could be used to operate an electrical solenoid valve to control power to the refrigerator or else the valve itself could be mounted in place of switch 56 and the valve could be controlled by a valve plunger which would correspond to the push button actuator 58.

The temperature regulator indicated generally by the reference numeral 95 in FIG. 2 is similar in part to the temperature regulator 10 except that it is designed to operate with a minimum temperature differential. In particular regulator 95 is enclosed in a housing 97. The temperature regulator includes a remote temperature sensitive capillary tube 99, a connecting tube 96, and a resilient bellows 98, all mounted in or associated with housing 97. A push member 100 is secured to the free end 102 of bellows 98 and is movable therewith. The temperature regulator also includes a lever assembly 104 comprising arms 106 and 108 pivotally mounted in the housing 92 on pivot pin 110. Arm 106 is provided with a recess 112 for receiving the push member 100 and the free end 114 of the arm 106 extends through a slotted opening 116 in wall 118 of housing 97 whereby the ends of the slotted opening 116 serve as limits for the movement of the lever assembly 104.

Wall 118 is also provided with a threaded opening 120 for receiving a universal range screw 122. A threaded recess 124 is formed in the head 126 of the range screw so that dial adaptor shafts for various model refrigerators can be mounted therein to accommodate the various control dials in each model refrigerator.

A range spring retaining nut 128 to which one end 130 of a range spring 132 is attached is threaded onto the portion of the range screw inside the housing 97 as shown in FIG. 2. The opposite end 134 of the range spring 132 is hooked onto an opening 135 formed in arm 108 of lever 104.

The range screw 122 is adjusted to put range spring 132 in tension so as to exert a clockwise torque on the lever assembly 104. An electric switch 136 is mounted on arm 108 of lever assembly 104 and is movable therewith. This electric switch is provided with a push button actuator 138 which is biased outwardly to a switch closed position by an internal spring member (not shown). When the push button actuator 138 is pressed, the contacts (not shown) in switch 136 open in a manner well known in the art.

To this point, the operation of temperature regulator 95 is identical to the operation of the corresponding parts of temperature regulator 10. In this embodiment, however, the switch arm extension 142 is rigidly attached to the push button actuator 138 and forms an extension thereof, so that extension 142 may be described as part of lever arm 108. An abutment 144, which in the embodiment shown comprises a screw mounted on a support 146 is positioned close to the switch arm extension 142. Adjustment of the screw 144 is by means of an opening 148 formed in the wall 118 of the housing 97.

The operation of the lever assembly 104 is the same as described in connection with regulator 10. As the refrigerator motor operates, the temperature in the refrigerator decreases causing the gas pressure in capillary tube 99 to drop. This permits bellows 98 to contract and the tension in range spring 132 then causes lever assembly 104 to rotate in the clockwise direction. This clockwise rotation continues until switch arm extension 142 engages the end 150 of the abutment or screw 144. This contact depresses the push button actuator 138 opening the contacts in switch 136. Since the terminals 151 and 153 connected to switch 136, are in the circuit of the refrigerator motor, the opening of the contacts in switch 136 stops the motor. Consequently abutment 144 may be described as a switch off actuator.

After the refrigerator motor has stopped, the temperature in the refrigerator starts to rise increasing the gas pressure in the capillary tube and expanding the bellows 98. This causes the lever assembly 104 to rotate in a counterclockwise direction. However as soon as the lever assembly 104 rotates enough so that the switch arm extension 142 is no longer in contact with the end 150 of the abutment or screw 144, the internal spring member in switch 136 (not shown) biases the push button actuator 138 outwardly to a switch closed position, thereby starting the motor. With this arrangement, the temperature in the refrigerator is kept substantially constant and the temperature differential is a minimum. It is clear that the adjustment of the tension in the range spring 132 controls the temperature at which the refrigerator will be maintained. Although as shown in FIG. 2 of the drawing, switch 136 is mounted on arm 108 and extension 142 engages switch off actuator 144, it is also contemplated that switch 136 could be adjustably mounted on wall 118 with lever arm extension 142 positioned in the path of arm 108 of lever assembly 104.

Another embodiment of a variable differential temperature regulator indicated generally by the reference numeral 152 is shown in FIG. 3. This embodiment resembles the embodiments of the regulators shown in FIGS. 1 and 2 in that regulator 152 is provided with a capillary tube 155, a bellows 154, a range adjustment mechanism 157, and a lever assembly 156. In addition the angular position of the lever assembly is a function of the temperature of the gas in the capillary tube 155.

The embodiment shown in FIG. 3 differs from the regulators shown in FIGS. 1 and 2 in that the electrical switch 158 is mounted in a fixed position on the wall 160 of the regulator housing 162. Switch actuating screws 164 and 166 extend through threaded openings in arm 168 of the lever assembly 156, as shown in the drawing. The switch actuator 170 of the electrical switch 158 moves pivotally and includes actuating arms 172 and 174 rigidly connected thereto, as shown in the drawing.

As stated above, the angular position of the lever assembly 156 is a function of the temperature in the capillary tube 155 and when the refrigerator motor is operating, the decrease in the temperature in the refrigerator, decreases the pressure in the capillary tube, permitting bellows 154 to contract, so that the lever assembly starts to pivot in the clockwise direction. This movement continues until the end 176 of screw 166 abuts actuating arm 174 of the switch actuator 170, pivoting the switch actuator to a motor off open contact position. The switch 158 is designed so that once the switch actuator is pivoted to the switch off open contact position, the switch remains in that position, until a positive external force is exerted on the switch actuator to restore it to its closed contact position.

After the contacts in switch 158 are opened, the refrigerator motor stops and the temperature in the refrigerator gradually increases, causing a reverse rotation of the lever assembly 156, as explained above. This continues until the end 178 of screw 164 abuts actuating arm 172 and forces the switch actuator 170 back to a switch on closed contact position. Then the cycle is repeated.

It is clear that the amount of swing permitted before the switch 158 is actuated, depends on the spacing between the end 178 of screw 164 from actuating arm 172, and the spacing between the end 176 of screw 166 from actuating arm 174. Consequently adjustment of screws 164 and 166 provide a means for varying the differential of the temperature regulator 152. External adjustment of the screws 164 and 166 is made convenient by openings 180 and 182 in the actuating arm 172 and wall 184 of the housing 162, and by opening 186 in wall 188 of housing 162.

Another embodiment of a universal temperature regulator indicated generally by the reference numeral 190 is shown in FIG. 4. This embodiment resembles the embodiments shown in FIGS. 1, 2, and 3 in that regulator 190 is provided with a capillary tube 192, a bellows 194, a lever assembly 196, and a range adjustment mechanism 197. In addition, the angular position of the lever assembly 196 is a function of the temperature of the gas in the capillary tube. The lever assembly 196 includes arms 198 and 200 as shown, and the free end 202 of arm 200 acts as an actuator as described below.

On wall 206 of the housing 191 adjustably positioned contacts 208 and 210 are mounted. As seen contacts 208 are normally closed while contacts 210 are normally open. Contacts 210 are mounted on a support 212 while contacts 208 are mounted on support 214. Supports 212 and 214 are slidably mounted on wall 206 by means of guide bolts 217 and 219 which extend out from supports 212 and 214 into narrow guide slots 213 and 215 formed in wall 206. Screws 216 and 218 extend through openings 220 and 224 formed in walls 222 and 226 and on into threaded engagement with supports 212 and 214, as shown. With this arrangement the position of supports 212 and 214, and hence the position of the contacts 208 and 210 with respect to the free end 202 of arm 200 can be varied by adjustment of screws 216 and 218. The above described mechanism for changing the position of contacts 208 and 210 is only exemplary and it is evident that the position of the electrical contacts can be varied by many different kinds of mechanisms. As with the other embodiments of the temperature regulator, suitable calibrations may be associated with the contacts 208 and 210 for convenient adjustment of the temperature differential.

As explained above, if the refrigerator motor 228 is operating, the temperature in the refrigerator will drop, thus decreasing the pressure in capillary tube 192, causing the lever assembly 196 to pivot in the clockwise direction. If the refrigerator is not operating, the temperature in the refrigerator will rise causing the lever assembly 196 to pivot in the counterclockwise direction.

If the lever assembly 196 pivots far enough in the clockwise direction (due to the operation of the refrigerator motor 228, and the consequent cooling of the refrigerator), the free end 202 of arm 200 will engage contact arm 230 of the normally closed contacts 208, thereby opening contacts 208. When the refrigerator motor is off, and the temperature in the refrigerator rises, the lever assembly 196 will pivot in the counterclockwise direction until the free end 202 of arm 200 engages and closes the normally open contacts 210. Contacts 208 and 210 are designed so that if they are actuated by the force exerted by the free end 202 of lever arm 200, they automatically revert to their initial state when the force exerted against them is removed.

Figure 5:
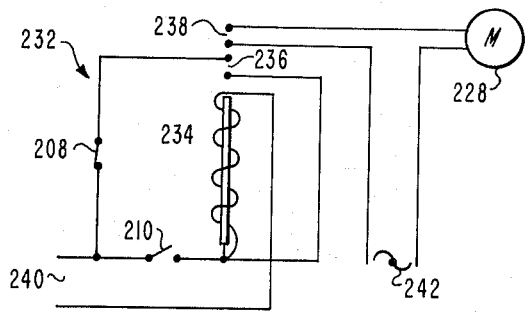
FIG. 5 is a circuit diagram for the temperature regulator shown in FIG. 4.

The electrical circuit indicated generally by the reference numeral 232 and shown in FIG. 5 includes contacts 208 and 210, and the circuit 232 is shown connected to the refrigerator motor 228. In addition the electrical circuit 232 includes a solenoid 234 with by-pass contacts 236 and motor contacts 238. Suitable electrical power sources 240 and 242 are connected to the solenoid 34 and refrigerator motor 228 as shown.

The operation of the universal temperature regulator 190 and control circuit 232 is as follows. Assume the refrigerator motor 228 is off. Then the temperature inside the refrigerator will gradually rise causing the lever assembly 196 to pivot in the counterclockwise direction, until the free end 202 of arm 200 engages and closes contacts 210.

As seen in FIG. 5, this actuates solenoid 234 closing contacts 236 and 238, and this in turn starts the refrigerator motor 228. The operation of the refrigerator motor lowers the temperature in the refrigerator causing the lever assembly 196 to rotate in the clockwise direction. It is noted that as the free end 202 of lever arm 200 backs away from engagement with contacts 210, the contacts 210 automatically open. This however, as can be seen in FIG. 5, does not affect the operation of refrigerator motor 228 because the circuit from power source 240 is completed to solenoid 234 through the by-pass contacts 236, which were closed when contacts 210 were initially closed. Consequently contacts 236 and 238 remain closed, even after contacts 210 open so that the refrigerator motor 228 continues to operate.

Continued operation of refrigerator motor 228 gradually decreases the temperature in the refrigerator and brings the free end 202 of arm 200 into engagement with contact arm 230, thereby opening contacts 208. As can be seen in FIG. 5, when contacts 208 open power is cut off to the solenoid 234 causing by-pass contacts 236 and motor contacts 238 to open. As a result the refrigerator motor is stopped, so that the cycle can be repeated.

Figure 10:
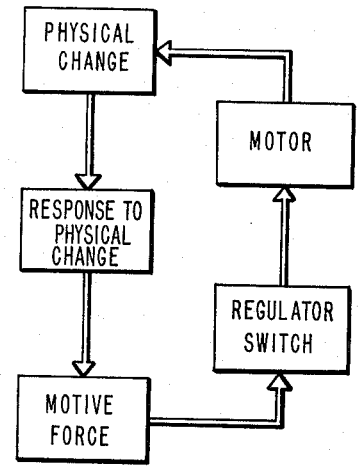
FIG. 10 is a diagram showing the broad application of the regulator described in this invention.

To this point the regulators shown in FIGS. 1, 2, 3, and 4 have been described as temperature regulators for refrigerators. It is apparent, however that these regulators can be used to regulate other kinds of physical conditions. For example by connecting the bellows of the regulators to a gas pressure tank, the above described regulators can be used to control and regulate the pressure in these tanks within desired limits. Generally speaking, as shown in FIG. 10, the regulators described above can be used to control any kind of operation wherein operation of a motor causes a physical change, e.g. a change in temperature, pressure, etc., if the physical change produces a response which can actuate a motive source, like a bellows to affect the operation of the regulator.

Although several exemplary embodiments of the regulators have been described, it is to be understood that modifications may be made in the regulators described above, and in their application, without departing from the broader spirit and scope of the present invention, as set forth in the following claims.

I claim:

1. A temperature regulator for a refrigerator comprising a support, a gas-filled capillary tube adapted to be mounted in a refrigerator, a bellow, said bellows mounted on said support, said capillary tube connected to said bellows in such a way that as the temperature in the capillary tube increases, said bellows expands and as the temperature in the capillary tube decreases said bellows contracts, a two armed lever pivotally mounted on said support, said bellows associated with one arm of said lever in such a way that as the bellows expands it engages said one lever arm and forces said lever to rotate in one direction, a range spring connected between the other arm of said lever and said support in such a way that as the temperature in said capillary tube decreases causing said bellows to contract, said range spring causes said lever to rotate in the opposite direction whereby the angular position of said lever on said support is functionally related to the temperature in the capillary tube, range control means for varying the tension in said range spring to control the range of the temperature regulator, a refrigerator control for starting and stopping a refrigerator, said refrigerator control including a housing, a plunger mounted in said housing and movable between an extended refrigerator-on position and a retracted refrigerator-off position, first means biasing said plunger to an extended position, said refrigerator control mounted on said other arm of said lever with said plunger extending out therefrom, an actuating arm, said actuating arm in spaced relation to said other arm of said lever and connected thereto by a second biasing means, said second biasing means biasing said actuating arm toward said other lever arm in such a way that the plunger in said refrigerator control lightly contacts and spaces said actuating arm from said other lever arm, a refrigerator-off refrigerator control actuator and a refrigerator-on refrigerator control actuator mounted on said support and positioned in spaced relation to each other and to said other lever arm, said refrigerator control actuators positioned so that continued movement of said other lever arm in one direction in response to a decrease in the temperature in the refrigerator causes an engagement between said actuating arm and said refrigerator-off refrigerator control actuator thereby forcing said plunger to a retracted refrigerator-off position and permitting thereby an increase in the temperature in the refrigerator whereby said other lever arm eventually moves in a reverse direction, and continued movement of said other lever arm in said reverse direction causes an engagement between said actuating arm and said refrigerator-on refrigerator control actuator, which forces said actuating arm out of spacing contact with said plunger whereby the plunger is biased by said first biasing means outwardly to a refrigerator-on position, said first and second biasing means balancing each other so said plunger acts to space and lightly contact said actuating arm and said other lever arm while the plunger is in an extended or retracted position and said actuating arm is intermediate said refrigerator control actuators, but said refrigerator control is only actuated and said plunger is only moved when said actuating arm engages any of said refrigerator control actuators, said refrigerator-on and said refrigerator-off refrigerator control actuators positioned so said refrigerator-off refrigerator control actuator acts to set the lower temperature limit of the refrigerator and said refrigerator-on refrigerator control actuator sets the upper temperature limit of the refrigerator, and means for varying the position of said refrigerator-on and said refrigerator-off refrigerator control actuators with respect to said refrigerator control on said other arm of said lever so that the upper and lower limits of the temperature in the refrigerator may be varied, and means for holding said plunger in a retracted refrigerator-off position independently of the angular position of said lever on said support so that said refrigerator may be turned off, said means for holding said plunger in a retracted refrigerator-off position independently of the angular position of said lever on said support, comprising a rod, said actuating arm provided with an opening extending therethrough positioned generally coaxial with said plunger, said rod slidably mounted in said opening and movable into and out of engagement with said plunger, a cam associated with said rod and movable into engagement therewith for forcing said rod against said plunger, whereby the plunger may be held in a retracted refrigerator-off position and manually operable means for forcing said cam into engagement with said rod whereby said rod holds said plunger into a retracted refrigerator-off position independently of the angular position of said lever on said support.

2. A temperature regulator for a refrigerator comprising a support, a gas-filled capillary tube adapted to be mounted in a refrigerator, a bellows, said bellows mounted on support, said capillary tube connected to said bellows in such a way that as the temperature in the capillary tube increases said bellows expands and as the temperature in the capillary tube decreases said bellows contracts, a two armed lever pivotally mounted on said support, said bellows associated with one arm of said lever in such a way that as the bellows expands it engages said one lever arm and forces said lever to rotate in one direction, a range spring connected between the other arm of said lever and said support in such a way that as the temperature in said capillary tube decreases causing said bellows to contract, said range spring causes said lever to rotate in the opposite direction whereby the angular position of said lever on said support is functionally related to the temperature in the capillary tube, range control means for varying the tension in said range spring to control the range of the temperature regulator, a refrigerator control for starting and stopping a refrigerator, said refrigerator control including a housing, a plunger mounted in said housing and movable between an extended refrigerator-on position and a retracted refrigerator-off position, first means biasing said plunger to an extended position, said refrigerator control mounted on said other arm of said lever with said plunger extending out therefrom, an actuating arm, said actuating arm in spaced relation to said other arm of said lever and connected thereto by a second biasing means, said second biasing means biasing said actuating arm toward said other lever arm in such a way that the plunger in said refrigerator control lightly contacts and spaces said actuating arm from said other lever arm, a refrigerator-off refrigerator control actuator and a refrigerator-on refrigerator control actuator mounted on said support and positioned in spaced relation to each other and to said other lever arm, said refrigerator control actuators positioned so that cotninued movement of said other lever arm in one direction in response to a decrease in the temperature in the refrigerator causes an engagement between said actuating arm and said refrigerator-off refrigerator control actuator thereby forcing said plunger to a retracted refrigerator-off position and permitting thereby an increase in the temperature in the refrigerator whereby said other lever arm eventually moves in a reverse direction, and continued movement of said other lever arm in said reverse direction causes an engagement between said actuating arm and said refrigerator-on refrigerator control actuator which forces said actuating arm out of spacing contact with said plunger whereby the plunger is biased by said first biasing means outwardly to a refrigerator-on position, said first and second biasing means balancing each other so said plunger acts to space and lightly contact said actuating arm and said other lever arm while the plunger is in an extended or retracted position and said actuating arm is intermediate said refrigerator control actuator, but said refrigerator control is only actuated and said plunger is only moved when said actuating arm engages any of the said refrigerator control actuators, said refrigerator-on and said refrigerator-off refrigerator control actuators positioned so said refrigerator-off refrigerator control actuator acts to set the lower temperature limit of the refrigerator and said refrigerator on refrigerator control actuator sets the upper temperature limit of the refrigerator, and means for varying the position of said refrigerator-on and said refrigerator-off refrigerator control actuators with respect to said refrigerator control on said other arm of said lever so that the upper and lower limits of the temperature in the refrigerator may be varied, said second biasing means comprising a balancing spring, one end of said balancing spring secured to said other lever arm, said actuating arm, having a threaded opening formed therein, and adjusting screw in threaded engagement with said opening, the opposite end of said balancing spring secured to said adjusting screw, whereby the tension in said balancing spring may be adjusted to counteract the force exerted by said first biasing means, so that said actuating arm will move in relation to said lever arm only when it engages either of said refrigerator control actuators.

References Cited by the Examiner
UNITED STATES PATENTS

| | | | |
|---|---|---|---|
| 2,251,830 | 8/1941 | Holmes | 200—83 |
| 2,447,874 | 8/1948 | Bauman | 200—140 |
| 2,492,675 | 12/1949 | Yeida | 200—83 X |
| 2,853,583 | 9/1958 | Rauh | 200—140 |

BERNARD A. GILHEANY, *Primary Examiner.*

G. MAIER, *Assistant Examiner.*